United States Patent [19]
Joulie et al.

[11] Patent Number: 5,373,242
[45] Date of Patent: Dec. 13, 1994

[54] DEVICE FOR DETECTING AND FOR INDICATING FAULT CURRENT THROUGH A LIGHTNING ARRESTOR OR AN INSULATOR

[75] Inventors: René Joulie, Vichy; René Parraud, Puy Guillaume; Serge Tartier, Cusset, all of France

[73] Assignee: Sediver Societe Europeenne d'Isolateurs en Verre et Composite, Nanterre Cedex, France

[21] Appl. No.: 38,804

[22] Filed: Mar. 29, 1993

[30] Foreign Application Priority Data

Mar. 30, 1992 [FR] France .................. 92 03808
Apr. 10, 1992 [FR] France .................. 92 04428

[51] Int. Cl.$^5$ ............................. G01R 31/00
[52] U.S. Cl. ...................... 324/552; 324/551; 324/102
[58] Field of Search ........... 324/551, 552, 102, 123 R, 324/156, 557

[56] References Cited

FOREIGN PATENT DOCUMENTS 970979 1/1951 France .
2603418 3/1988 France .
1005040 9/1965 United Kingdom .

Primary Examiner—Kenneth A. Wieder
Assistant Examiner—Glenn W. Brown
Attorney, Agent, or Firm—Sughrue, Mion, Zinn, Macpeak & Seas

[57] ABSTRACT

A device for detecting and indicating a fault current flowing through a lightning arrestor or an insulator, the current being DC or at AC mains frequency, the device being housed inside a box that is provided with a frangible window and that has a piece of metal electrically connected to an end fitting of the lightning arrestor or of the insulator passing therethrough. The device has: a transformer for transforming the current, the primary of the transformer being constituted by the piece of metal, and the secondary of the transformer being connected to a peak-limiting circuit to make pulses of current due to surges corresponding, in particular, to lightning strikes inoperative; a heating resistance fed by said transformer and constituting an igniter for a pyrotechnic composition in which it is embedded, the composition being designed to break the frangible window; and preferably indicator means suitable for being released by rupture of the frangible window.

7 Claims, 3 Drawing Sheets

DEVICE FOR DETECTING AND FOR INDICATING FAULT CURRENT THROUGH A LIGHTNING ARRESTOR OR AN INSULATOR

FIELD OF THE INVENTION

The present invention relates to a device for detecting and indicating a fault current through a lightning arrestor or an insulator. It is particularly applicable to monitoring overhead lines at medium tension or at high tension. It applies to all kinds of insulators. It also applies to all kinds of lightning arrestors, whether connected directly between a phase and ground, or in series with an air gap between a phase and ground. The insulators may be made of glass, of ceramic, or of composite material. The lightning arrestors may be of the kind having a ceramic case or a composite case, e.g. as described in European patents EP 304 690 and EP 397 163.

BACKGROUND OF THE INVENTION

The problem is to make it easy for an observer to see that a lightning arrestor or an insulator is carrying a fault current that may be a DC current or a current at mains AC frequency, and that has a magnitude that may, for example, be not less than about 1 amp. In addition, the detection device must be insensitive to current surges due to lightning, which are very large in amplitude (several tens of kiloamps) but extremely short in duration (about a microsecond), i.e. the kind of surge for which lightning arrestors are designed.

French patent application FR-A-2 652 457 discloses a lightning arrestor provided with a visible fault indicator. Use is made of the fact that the lightning arrestor case is inflated under the pressure of gases generated by an internal short circuit within the lightning arrestor. A deformable bracelet surrounding the case is expelled under the effect of such inflation.

Such an indicator suffers from the drawback of operating only with fault currents of several hundreds of amps that give rise to significant amounts of inflation. It is therefore not very sensitive.

French patent application FR-A-2 603 418 discloses an indicator for indicating that a lightning arrestor is in short circuit, which indicator comprises an elastically deformable colored strip clipped against the base of the lightning arrestor by a latch mechanism. The latch is associated with an electrical filter inside the lightning arrestor which, under the effect of a fault current, causes a wire to melt, thereby releasing the latch, and the colored strip is then projected out from the lightning arrestor.

Such an indicator suffers from the drawback of not operating with fault currents of about 1 amp, and of establishing an electrical voltage across its terminals that alters the protection level for which the lightning arrestor is designed in the event of a current surge due to lightning.

OBJECT AND SUMMARY OF THE INVENTION

An object of the present invention is to provide a detection device that is more accurate than prior devices, that is capable of being triggered under the effect of a relatively low value of fault current, about 1 amp or more, whether the current is direct or at mains frequency (48 Hz to 62 Hz), regardless of the voltage applied to the lightning arrestor, and regardless of the kind of lightning arrestor in question.

The present invention provides a device for detecting and indicating a fault current flowing through a lightning arrestor or an insulator, the current being DC or at AC mains frequency, the device being housed inside a box that is provided with a frangible window and that has a piece of metal electrically connected to an end fitting of the lightning arrestor or of the insulator passing therethrough, the device comprising:

a transformer for transforming said current, the primary of the transformer being constituted by said piece of metal, and the secondary of the transformer being connected to a peak-limiting circuit to make pulses of current due to surges corresponding, in particular, to lightning strikes inoperative; and a heating resistance fed by said transformer and constituting an igniter for a pyrotechnic composition in which it is embedded, said composition being designed to break said frangible window.

The absence of said frangible window constitutes means for indicating a fault current. However, to further facilitate monitoring of a lightning arrestor or of an insulator, it is advantageous to provide additional indicator means inside said box and suitable for being released by the rupture of said frangible window.

In one improvement, said indicator means is a colored and weighted strip or flag of material that may optionally be made fireproof.

In a variant, said piece of metal is an integral portion of the said end fitting of a lightning arrestor or of an insulator.

In all embodiments, said resistance and said pyrotechnic composition may be calibrated so that the device triggers on a fault current of about 1 amp that lasts for a minimum duration of not less than 10 milliseconds.

In an improvement, a system is provided for counting said current pulses, which system is connected in parallel with said peak-limiting circuit.

BRIEF DESCRIPTION OF THE DRAWINGS

Other features and advantages of the invention appear from the following description of an embodiment given by way of non-limiting illustration. In the accompanying drawings.

MORE DETAILED DESCRIPTION

Figure 1:
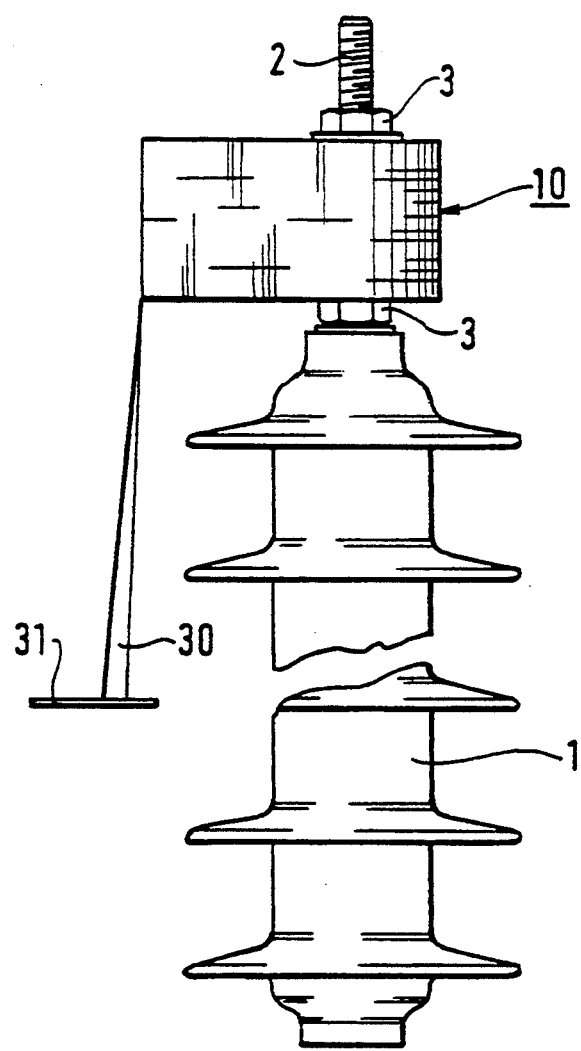
FIG. 1 is a diagrammatic elevation view of a lightning arrestor together with its detector and indicator device that is visible after being triggered.
Figure 3:
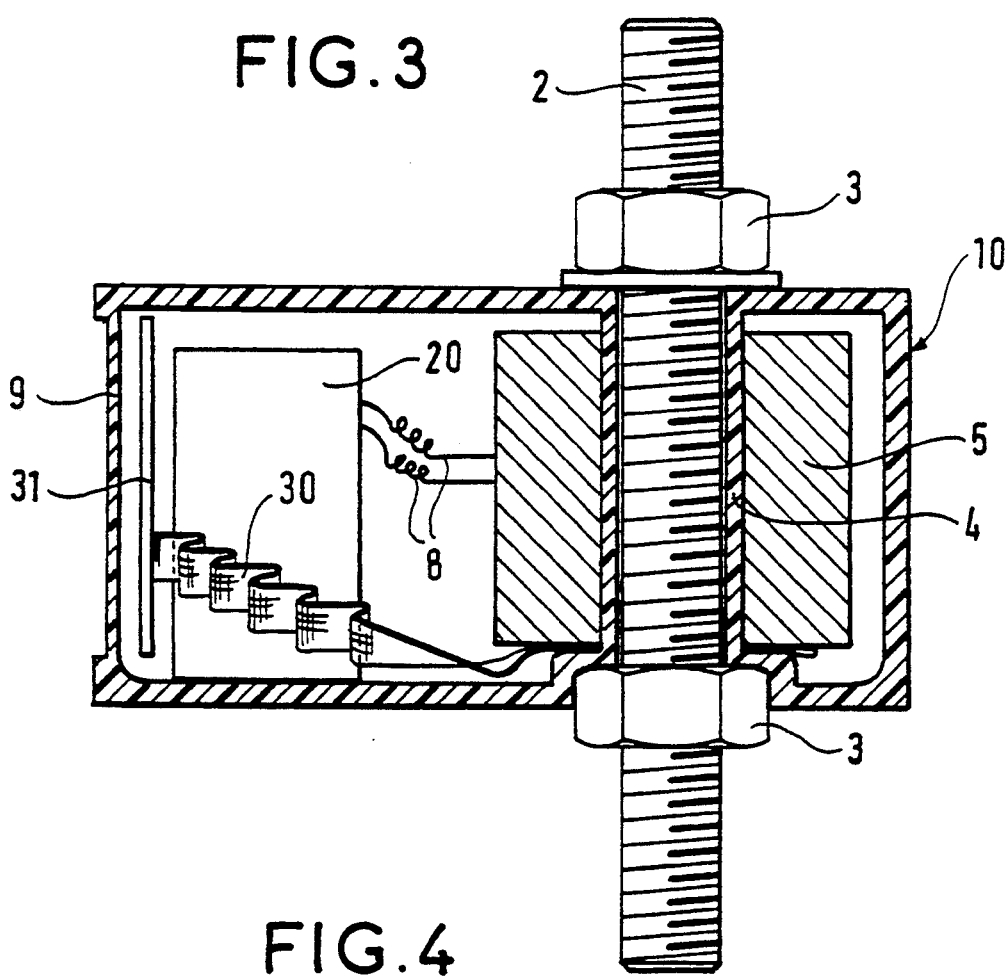
FIGS. 3 and 4 are diagrammatic fragmentary section views respectively in elevation and as seen from above showing the detection and indication device of the invention before it is triggered.
Figure 4:
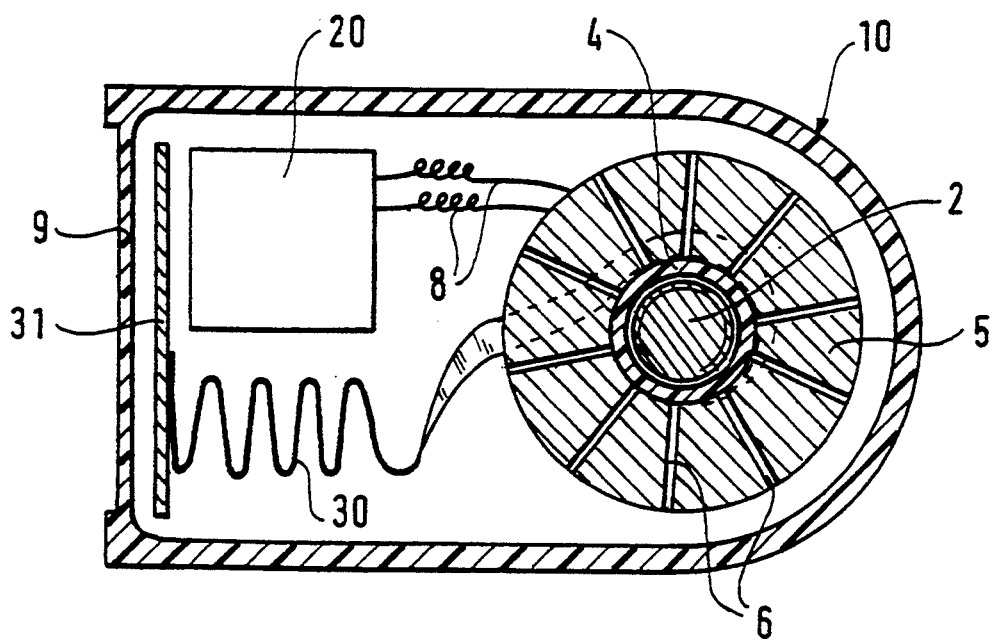

FIG. 1 shows a lightning arrestor 1 having one end fitting provided with a threaded metal rod 2. A sealed box 10 made of synthetic material and visible in greater detail in section in FIGS. 3 and 4 is threaded, injected, or glued onto said threaded metal rod. The box 10 is secured to the rod 2 by nuts 3. It includes a frangible window 9, e.g. a wall having edges that have been weakened, which wall is liable to be expelled under the effect of excess pressure inside the box 10.

Internally, the box 10 defines a chimney 4 containing the rod 2 and surrounded by a magnetic torus 5 having a few turns 6 coiled thereabout to define the secondary of a current transformer 7 whose primary is constituted by the rod 2. The terminals 8 of the transformer secondary 7 are connected to the inputs of a circuit 20 whose electrical circuit diagram is given in FIG. 2. This circuit contains a peak-limiting circuit 21 which is constituted by a varistor, or by a Zener diode, or by a spark gap, in parallel with a resistor 22 embedded in a pyrotechnic composition 23. A conventional pulse counting system may be provided in parallel with the peak-limiting circuit 21.

When a DC or AC mains fault current flows through the lightning arrestor 1, and consequently through the rod 2, a current is generated in the turns 6 (depending on the current ratio selected for the transformer 7), thereby feeding the resistor 22. If the temperature of the resistor reaches a selected critical value, then the pyrotechnic composition explodes, thus creating excess pressure inside the box 10 and ejecting the frangible window 9.

In the event of surge due to lightning, a current pulse of the order of several hundreds to several thousands of amps appears for a very short period of time in the rod 2. The potential across the terminals of the resistor 22 thus increases until the peak-limiting circuit 21 becomes operative and diverts a large fraction of the current. As a result the detector device of the invention is not triggered under such circumstances.

Figure 2:
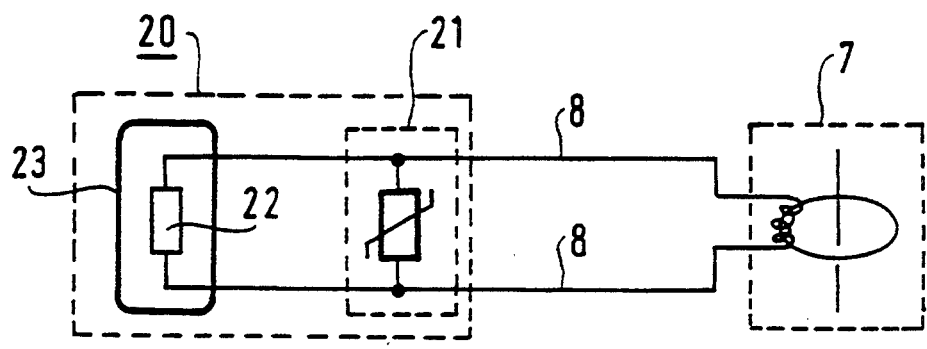
FIG. 2 shows the electrical circuit of the essential components of a detector and indicator device in accordance with the invention.

The various parameters of the circuit shown in FIG. 2 are selected so as to make it possible to detect a fault current of 1 amp having a duration of more than 10 milliseconds.

In the embodiment shown, to make it easier for an observer located at the bottom of a pole that supports the lightning arrestor 1 to observe the device, the box 10 contains a colored flameproof flag or tape (strip) 30 whose end is connected to a weight 31. This assembly is ejected together with the window 9 when triggering occurs.

Figure 5:
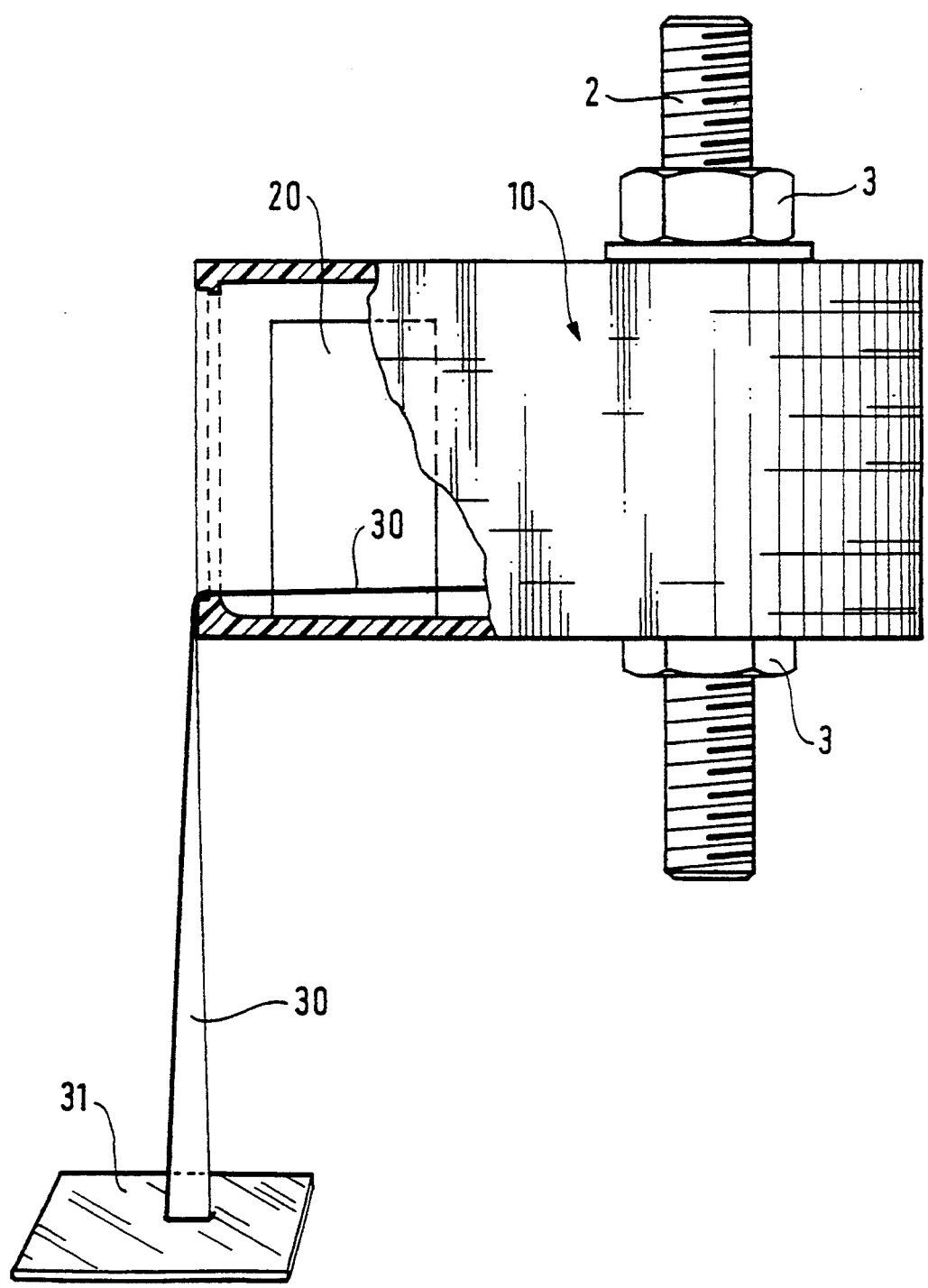
FIG. 5 is a view similar to FIG. 3, showing the detector and indicator device after it has been triggered, i.e. after a fault current has appeared.

FIG. 5 shows the box 10 after it has been triggered.

The invention is naturally not limited to the embodiment described above. The lightning arrestor 1 could be replaced by an insulator. Without going beyond the scope of the invention, any means could be replaced by equivalent means. The rod 2 may be replaced by a metal part of some other shape, providing it is electrically connected to an end fitting of a lightning arrestor or of an insulator.

We claim:

1. A device for detecting and indicating a fault current flowing through an element selected from a group consisting of a lightning arrestor and an insulator, the current being DC or at AC mains frequency, the device being housed inside a box that is provided with a frangible window and that has a piece of metal electrically connected to an end fitting of the element, said end fitting passing through said element, the device comprising:

a transformer for transforming said current, the primary of the transformer being constituted by said piece of metal, and the secondary of the transformer being connected to a peak-limiting circuit to make pulses of current, due to surges, inoperative; and a heating resistance fed by said transformer and constituting an igniter for a pyrotechnic composition in which it is embedded, said composition, upon explosion, rupturing said frangible window.

2. A device according to claim 1, wherein said box also contains indicator means releasable by the rupture of said frangible window.

3. A device according to claim 2, wherein said indicator means is selected from a group consisting of (1) a colored and weighted strip of material and (2) a colored and weighted flag of said material.

4. A device according to claim 3, wherein said material is fireproof.

5. A device according to claim 1, further including a system for counting said current pulses and connected in parallel with said peak-limiting circuit.

6. A device according to claim 1, wherein said resistance and said pyrotechnic composition are calibrated so that the device triggers for a leakage current of about 1 amp that lasts for a minimum duration of not less than 10 milliseconds.

7. A device according to claim 1, wherein said piece of metal is an integral portion of said end fitting of said element.

* * * * *